United States Patent
D'Agostini et al.

(10) Patent No.: US 7,717,701 B2
(45) Date of Patent: May 18, 2010

(54) PULVERIZED SOLID FUEL BURNER

(75) Inventors: Mark Daniel D'Agostini, Ebensburg, PA (US); Francis Anthony Milcetich, Coopersburg, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 114 days.

(21) Appl. No.: 11/585,472

(22) Filed: Oct. 24, 2006

(65) Prior Publication Data

US 2008/0184919 A1     Aug. 7, 2008

(51) Int. Cl.
*F23M 3/00*     (2006.01)

(52) U.S. Cl. ............... 431/9; 431/2; 431/8; 431/10; 431/115; 431/173; 110/264; 110/265; 110/341; 110/347

(58) Field of Classification Search ............... 431/2, 431/8, 9, 115, 173, 187, 181, 10, 185, 104; 110/341, 263, 347, 265, 264, 187, 262
See application file for complete search history.

(56) References Cited

U.S. PATENT DOCUMENTS

| | | | | |
|---|---|---|---|---|
| 3,729,285 | A | * | 4/1973 | Schwedersky ............ 431/8 |
| 3,894,834 | A | | 7/1975 | Estes |
| 4,274,343 | A | | 6/1981 | Kokkinos |
| 4,448,135 | A | | 5/1984 | Dougan et al. |
| 4,474,120 | A | * | 10/1984 | Adrian et al. ............ 110/261 |
| 4,497,263 | A | | 2/1985 | Vatsky et al. |
| 4,797,087 | A | | 1/1989 | Gitman |
| 4,902,221 | A | * | 2/1990 | Collins et al. ............ 431/183 |
| 4,902,223 | A | | 2/1990 | Young et al. |
| 4,928,605 | A | | 5/1990 | Suwa et al. |
| 5,090,339 | A | * | 2/1992 | Okiura et al. ............ 110/263 |
| 5,104,310 | A | | 4/1992 | Saltin |
| 5,113,771 | A | * | 5/1992 | Rini et al. ............ 110/263 |
| 5,388,536 | A | * | 2/1995 | Chung ............ 110/264 |
| 5,685,242 | A | * | 11/1997 | Narato et al. ............ 110/262 |
| 5,743,723 | A | | 4/1998 | Iatrides |
| 5,829,367 | A | * | 11/1998 | Ohta et al. ............ 110/261 |
| 5,829,369 | A | * | 11/1998 | Sivy et al. ............ 110/347 |
| 5,904,475 | A | * | 5/1999 | Ding ............ 431/8 |

(Continued)

FOREIGN PATENT DOCUMENTS

EP     0 340 424 A2     11/1989

(Continued)

*Primary Examiner*—Steven B McAllister
*Assistant Examiner*—Avinash Savani
(74) *Attorney, Agent, or Firm*—Eric J. Schaal (57) ABSTRACT

A burner includes a first oxidant conduit to transmit a first stream of an oxidant; a solid fuel conduit having an outtake and surrounding the first oxidant conduit, thereby forming a first annulus to transmit a mixture of a transport gas and particles of a solid fuel; a second oxidant conduit surrounding the solid fuel conduit, thereby forming a second annulus to transmit a second stream of the oxidant or an other oxidant; and means for segregating the mixture proximate the outtake into a lean fraction stream and a dense fraction stream. The first stream of the oxidant exiting the first oxidant conduit combines during combustion with the lean fraction stream, thereby forming an inner combustion zone adjacent the outtake, and the second stream of the oxidant, or the other oxidant, exiting the second oxidant conduit combines during combustion with the dense fraction stream, thereby forming an outer combustion zone.

21 Claims, 6 Drawing Sheets

U.S. PATENT DOCUMENTS

| | | | |
|---|---|---|---|
| 5,979,342 A * | 11/1999 | Leisse et al. | 110/264 |
| 6,190,158 B1 * | 2/2001 | Legiret et al. | 431/8 |
| 6,210,151 B1 * | 4/2001 | Joshi et al. | 431/8 |
| 6,367,394 B1 * | 4/2002 | Kaneko et al. | 110/263 |
| 6,475,267 B1 | 11/2002 | Lehn | |
| 6,685,461 B2 | 2/2004 | Rio et al. | |
| 6,715,432 B2 | 4/2004 | Tsumura et al. | |
| 6,752,620 B2 | 6/2004 | Heier et al. | |
| 6,843,185 B1 | 1/2005 | Taylor | |
| 6,889,619 B2 | 5/2005 | Okazaki et al. | |
| 6,951,454 B2 * | 10/2005 | Sarv et al. | 431/9 |
| 2002/0069757 A1 | 6/2002 | Lehn | |
| 2002/0090583 A1 * | 7/2002 | Cain | 431/2 |
| 2003/0075843 A1 | 4/2003 | Wunsche | |
| 2004/0194681 A1 * | 10/2004 | Taylor | 110/261 |
| 2004/0211345 A1 | 10/2004 | Okazaki et al. | |

FOREIGN PATENT DOCUMENTS

| | | |
|---|---|---|
| JP | 60-194208 A | 2/1985 |
| JP | 60-194208 | 10/1985 |
| JP | 08-233217 A | 9/1996 |
| RU | 2038535 C1 | 6/1995 |
| RU | 2282105 C2 | 8/2006 |
| SU | 964341 A | 10/1982 |

* cited by examiner

PULVERIZED SOLID FUEL BURNER

BACKGROUND OF THE INVENTION

The present invention relates to fuel burners and methods for combusting solid fuels with oxidants, including but not limited to oxygen and oxygen-enriched air, and in particular to such burners and methods for combusting pulverized solid fuels for generating heat in industrial melting furnaces for glass, ceramic materials, metals, etc.

However, the invention is not limited to use with such industrial melting furnaces. Persons skilled in the art will recognize that the burners and methods of the present invention may be used in many other fired process heating applications, including but not limited to cement kilns and steam generators.

Solid fuel burners and methods for combusting solid fuels with oxidants, such as oxygen and/or oxygen-enriched air, are well known. Various types of such burners have been developed for different industries (e.g., glass melting), including oxy-fuel burners having concentric or coaxial passages for supply of fuel and oxygen. Such burners are disclosed in U.S. Pat. No. 5,104,310 (Saltin); U.S. Pat. No. 5,743,723 (Iatrides, et al.); and U.S. Pat. No. 6,685,461 (Rio, et al.). Other such burners are taught in U.S. Pat. No. 3,894,834 (Estes); U.S. Pat. No. 4,797,087 (Gitman); U.S. Pat. No. 4,902,223 (Young); U.S. Pat. No. 4,928,605 (Suwa, et al.); U.S. Pat. No. 6,843,185 (Taylor); and U.S. Patent Application Publication No. 2003/0075843 (Wunsche).

For example, U.S. Pat. No. 3,894,834 (Estes) discloses an axially positioned oxy-fuel burner within a coal/air burner for adjusting flame length and maintaining stability.

U.S. Pat. No. 5,743,723 (Iatrides, et al.) discloses a three-tube oxy-fuel burner comprising: an oxidant source of at least 80% oxygen; an outer and an inner oxidant passage, each connected to the oxidant source; a fuel conducting passage disposed between the two oxidant passages; and a valve to regulate the flow between the oxidant passages.

U.S. Pat. No. 6,685,461 (Rio, et al.) discloses a burner similar to that of Iatrides, et al. in the '723 patent, but with several structural and operational differences. For example, the burner is fastened to a burner quarl, and a control valve is housed in the burner for adjusting oxidant flows between the two oxidizer tubes. No limits are specified for the oxygen concentration of the oxidant.

U.S. Pat. No. 5,104,310 (Saltin) discloses an oxy-fuel burner with several configurations, each requiring a central oxygen nozzle connected to an oxygen-receiving chamber (which is part of the burner), at least one fuel nozzle radially spaced from the central oxygen nozzle, and at least one peripheral oxygen nozzle at a greater radial distance from the central oxygen nozzle (relative to the fuel nozzle(s)). Several variations include one or more of the following features: part of the means for supplying fuel and oxygen to the burner is a cooling jacket for the burner; peripheral oxygen nozzle(s) of a converging-diverging design; and a fuel nozzle that transmits only fuel (i.e., no carrier gas).

In addition to the oxy-fuel burners discussed above, many other solid fuel burners have been developed for burning pulverized coal and other fuels. Such burners are disclosed in U.S. Pat. No. 4,497,263 (Vatsky, et al.); U.S. Pat. No. 5,090,339 (Okiura, et al.); U.S. Pat. No. 6,715,432 (Tsumura, et al.); U.S. Pat. No. 6,752,620 (Heier, et al.); U.S. Pat. No. 6,889,619 (Okazaki, et al.); and JP 60-194208 (Takayuki Abe).

In addition, various devices have been developed for use with pulverized coal-fired burners and furnaces, especially during low load operations. For example, U.S. Pat. No. 4,274,343 (Kokkinos) discloses a device for stabilizing ignition of coal-fired flames during low load operation. U.S. Pat. No. 4,448,135 (Dougan, et al.) and U.S. Pat. No. 6,475,267 (Lehn) disclose different types of such devices for use with burners.

The burners and devices discussed above have addressed various problems relating to fuel burners and methods for combusting solid fuels. However, many problems remain, or have not been satisfactorily addressed.

For example, the prior art has not taught a burner and method for combusting a solid fuel which satisfactorily and simultaneously attain robust flame stability, enhanced turndown, adjustability of flame properties, and the ability to combust solid fuels of greatly varying properties, in particular, both high and low volatile solid fuels (including petroleum coke).

Other problems that occur with conventional solid fuel burners, especially at turndown (i.e., reduced firing rate) conditions, include weakening of the axial momentum of the burner flame, the loss of coherent flame structure, and shortening of the flame. In general, the prior art burners do not maintain a constant (or nearly constant) flame length over an entire operating regime.

There are fuels and/or combustion applications for which oxygen/fuel (so-called oxy/fuel) combustion or oxygen-enriched air/fuel combustion provide superior results relative to air/fuel combustion. While there are prior art patents pertaining to oxygen-based, solid fuel combustion [(e.g., U.S. Pat. No. 4,928,605 (Suwa, et al.) and U.S. Pat. No. 4,902,223 (Young)], these patents do not satisfactorily and comprehensively address the aforementioned problems while also attending to the challenges distinctive to oxygen-based combustion. Such challenges relate primarily, but not exclusively, to the high temperature created by oxygen-enhanced flames and the potentially detrimental effect that these flames can have on burner and furnace components. Buffering of the burner components from the high temperature oxygen-enhanced flame is often accomplished by the use of water-cooled jackets. Although such jackets nominally protect the burner components from many instances of high temperature damage, the jackets add complexity and cost to the operation, while not mitigating against one of the principal causes of high temperature damage, which is control of flow distribution (i.e., flow profiles within the burner nozzle) and mixing patterns of the reactants. In the case of solid fuel combustion, inadequate control of reactant flow distribution and mixing leads not only to high temperature damage, but also to impingment of solid particles and subsequent erosion of burner and furnace components.

In view of these and many other problems pertaining to prior art burners and methods for combustion of solid fuels with oxidants, it is desired to have a burner and a method for combustion which overcome the difficulties, problems, limitations, disadvantages, and deficiencies of the prior art to provide better and more advantageous results.

It is further desired to have a more efficient burner and method of combustion for combusting a solid fuel with an oxidant.

It is still further desired to have a burner and a method for combusting a solid fuel which attain robust flame stability, enhanced turndown, adjustability of flame properties, and the ability to combust solid fuels of greatly varying properties, in particular both high and low volatile solid fuels.

It is still further desired to have a burner and a method for combusting a solid fuel which achieve a longer, slower mixing flame with lower peak temperature than would otherwise be achieved with prior art burners and methods.

It is still further desired to have a burner and a method for combusting a solid fuel which efficiently operate over a wider range of firing rates than is normally attainable with burners and methods of the prior art.

It is still further desired to have a burner and a method for combusting a solid fuel which strengthen the axial momentum of the burner flame and prevent the loss of coherent flame structure that occurs with conventional solid fuel burners and combustion methods.

It is still further desired to have a burner and method for combusting a solid fuel which facilitate lengthening of the burner flame at reduced loads, and thereby provide a means for maintaining nearly constant flame length over an entire operating regime.

It is still further desired to have a burner and a method for combusting a solid fuel capable of stably burning low volatile solid fuels, such as petroleum coke.

It is still further desired to have a burner and a method for combusting a solid fuel wherein flame properties can be adjusted via control of reactant mixing properties.

It is also desired to have a burner and method for combusting a solid fuel capable of supporting oxygen-enhanced or oxygen-fuel combustion.

BRIEF SUMMARY OF THE INVENTION

The present invention includes a burner and a method for combusting a solid fuel. There are multiple embodiments of the burner and the method, as well as multiple variations of those embodiments.

There are multiple elements in a first embodiment of the burner for combusting a solid fuel. The first element is a first oxidant conduit having a first longitudinal axis, a first oxidant inlet, and a first oxidant outlet spaced apart from the first oxidant inlet. The first oxidant conduit is adapted to transmit at a first flow rate a first stream of an oxidant entering the first oxidant inlet and exiting the first oxidant outlet, the oxidant having an oxygen concentration greater than about 21 vol. %.

The second element is a solid fuel conduit having a second longitudinal axis substantially parallel to the first longitudinal axis, an intake, and an outtake spaced apart from the intake. The solid fuel conduit surrounds the first oxidant conduit and thereby forms a first annulus between the first oxidant conduit and the solid fuel conduit. The first annulus is adapted to transmit a mixture of a transport gas and a plurality of particles of the solid fuel entering the intake and exiting the outtake.

A third element is a second oxidant conduit having a third longitudinal axis substantially parallel to the second longitudinal axis, a second oxidant inlet, and a second oxidant outlet spaced apart from the second oxidant inlet. The second oxidant conduit surrounds the solid fuel conduit and thereby forms a second annulus between the solid fuel conduit and the second oxidant conduit. The second annulus is adapted to transmit at a second flow rate a second stream of the oxidant or an other oxidant having an oxygen concentration greater than about 21 vol. %, said second stream entering the second oxidant inlet and exiting the second oxidant outlet.

The fourth element is means for segregating the mixture proximate the outtake into a lean fraction stream of the mixture adjacent the first oxidant conduit and a dense fraction stream of the mixture adjacent the solid fuel conduit. The dense fraction stream contains a first mass ratio of the transport gas to the solid fuel, and the lean fraction stream contains a second mass ratio of the transport gas to the solid fuel, the second mass ratio being greater than the first mass ratio.

At least a portion of the first stream of the oxidant exiting the first oxidant outlet combines during combustion with at least a portion of the lean fraction stream, thereby forming an inner combustion zone adjacent the outtake. At least a portion of the second stream of the oxidant or the other oxidant exiting the second oxidant outlet combines during combustion with at least a portion of the dense fraction stream, thereby forming an outer combustion zone near the inner combustion zone.

There are many variations of the first embodiment of the burner. In one variation, at least one of the first flow rate and the second flow rate is variable. In another variation, the second oxidant conduit and the solid fuel conduit are substantially co-axial. In yet another variation, at least two of the first oxidant conduit, the solid fuel conduit, and the second oxidant conduit are co-axial.

In another variation, the means for segregating the mixture includes a swirl generator disposed in the first annulus proximate the outtake and a vortex finder disposed in the first annulus at a distance from the swirl generator at a location between the swirl generator and the outtake, the vortex finder having a hydraulic radius less than a first hydraulic radius of the first annulus.

There are several variants of this variation. In one variant, segregation of the mixture is adjusted by either increasing or decreasing at least one of the hydraulic radius of the vortex finder and the distance from the swirl generator to the vortex finder. In another variant, the vortex finder has either swirl vanes or straightening vanes adapted to contact at least one of the lean fraction stream and the dense fraction stream. In yet another variant, the outtake of the solid fuel conduit and a portion of the vortex finder proximate the outtake form a nozzle tip profile, and the nozzle tip profile is modified by at least one of an outward divergence of the outtake and an inward convergence of the portion of the vortex finder proximate the outtake.

In another variation, both the outtake and the first oxidant outlet are substantially parallel to each other and substantially in a first plane substantially perpendicular to both the second longitudinal axis at the outtake and the first longitudinal axis at the first oxidant outlet, and a portion of the first stream of the oxidant initially contacts a portion of the lean fraction stream of the mixture at about the first plane. In a variant of this variation, a portion of the second stream of the oxidant or the other oxidant initially contacts a portion of the dense fraction stream of the mixture at about another plane spaced apart from the first plane.

A second embodiment of the burner is similar to the first embodiment of the burner, but also includes a swirler disposed in the first oxidant conduit.

A third embodiment of the burner is similar to the first embodiment of the burner, but also includes an auxiliary gas conduit having a fourth longitudinal axis substantially parallel the third longitudinal axis, an auxiliary gas inlet, and an auxiliary gas outlet spaced apart from the auxiliary gas inlet. The auxiliary gas conduit surrounds the second oxidant conduit and thereby forms a third annulus between the second oxidant conduit and the auxiliary gas conduit. The third annulus is adapted to transmit at a third flow rate a stream of an auxiliary gas entering the auxiliary gas inlet and exiting the auxiliary gas outlet.

There are multiple steps in a first embodiment of the method for combusting a solid fuel. The first step is to provide a first oxidant conduit having a first longitudinal axis, a first oxidant inlet, and a first oxidant outlet spaced apart from the first oxidant inlet. The second step is to transmit through the first oxidant conduit at a first flow rate a first stream of an oxidant having an oxygen concentration greater than about 21 vol. %, the first oxidant entering the first oxidant inlet and exiting the first oxidant outlet. The third step is to provide a solid fuel conduit having a second longitudinal axis substantially parallel the first longitudinal axis, an intake and an outtake spaced apart from the intake, the solid fuel conduit surrounding the first oxidant conduit and thereby forming a first annulus between the first oxidant conduit and the solid fuel conduit. A fourth step is to transmit through the first annulus a mixture of a transport gas and a plurality of particles of the solid fuel, the mixture entering the intake and exiting the outtake. The fifth step is to provide a second oxidant conduit having a third longitudinal axis substantially parallel the second longitudinal axis, a second oxidant inlet, and a second oxidant outlet spaced apart from the second oxidant inlet, the second oxidant conduit surrounding the solid fuel conduit and thereby forming a second annulus between the solid fuel conduit and the second oxidant conduit. The sixth step is to transmit through the second annulus at a second flow rate a second stream of the oxidant or an other oxidant having an oxygen concentration greater than about 21 vol. %, the second stream entering the second oxidant inlet and exiting the second oxidant outlet. The seventh step is to segregate the mixture proximate the outtake into a lean fraction stream of the mixture adjacent the first oxidant conduit and a dense fraction stream of the mixture adjacent the solid fuel conduit, the dense fraction stream containing a first mass ratio of the transport gas to the solid fuel, and a lean fraction stream containing a second mass ratio of the transport gas to the solid fuel, the second mass ratio being greater than the first mass ratio. The eighth step is to combust at least a portion of the first stream of the oxidant with at least a portion of the lean fraction stream, thereby forming an inner combustion zone adjacent the outtake. The ninth step is to combust at least a portion of the second stream of the oxidant or the other oxidant with at least a portion of the dense fraction stream, thereby forming an outer combustion zone near the inner combustion zone.

There are many variations of the first embodiment of the method for combusting a solid fuel. In one variation, at least one of the first flow rate and the second flow rate is variable. In another variation, the first oxidant conduit and the solid fuel conduit are substantially co-axial. In yet another variation, at least two of the first oxidant conduit, the solid fuel conduit, and the second oxidant conduit are co-axial. In still yet another variation, a swirler is disposed in the first oxidant conduit.

In another variation, a swirl generator is disposed in the first annulus proximate the outtake, and a vortex finder is disposed in the first annulus at a distance from the swirl generator at a location between the swirl generator and the outtake, the vortex finder having a hydraulic radius less than a first hydraulic radius of the first annulus. In a variant of this variation, segregation of the mixture is adjusted by either increasing or decreasing at least one of the hydraulic radius of the vortex finder and the distance from the swirl generator to the vortex finder. In another variant, the vortex finder has either swirl vanes or straightening vanes adapted to contact at least one of the lean fraction stream and the dense fraction stream. In yet another variant, the outtake of the solid fuel conduit and a portion of the vortex finder proximate the outtake form a nozzle tip profile, and the nozzle tip profile is modified by at least one of an outward divergence of the outtake and an inward convergence of the portion of the vortex finder proximate the outtake.

In another variation of the method for combusting a solid fuel, both the outtake and the first oxidant outlet are substantially parallel to each other and substantially in a first plane substantially perpendicular to both the second longitudinal axis at the outtake and the first longitudinal axis at the first oxidant outlet, and a portion of the first stream of the oxidant initially contacts a portion of the lean fraction stream of the mixture at about the first plane. In a variant of this variation, a portion of the second stream of the oxidant or the other oxidant initially contacts a portion of the dense fraction stream of the mixture at about another plane spaced apart from the first plane.

A second embodiment of the method for combusting a solid fuel is similar to the first embodiment but includes two additional steps. The first additional step is to provide an auxiliary gas conduit having a fourth longitudinal axis substantially parallel to the third longitudinal axis, an auxiliary gas inlet, and an auxiliary gas outlet spaced apart from the auxiliary gas inlet, the auxiliary gas conduit surrounding the second oxidant conduit and thereby forming a third annulus between the second oxidant conduit and the auxiliary gas conduit. The second additional step is to transmit through the third annulus at a third flow rate a stream of an auxiliary gas entering the auxiliary gas inlet and exiting the auxiliary gas outlet.

BRIEF DESCRIPTION OF SEVERAL VIEWS OF THE DRAWINGS

The invention will be described by way of example with reference to the accompanying drawings, in which.

DETAILED DESCRIPTION OF THE INVENTION

The invention includes burners and a methods for combusting a solid fuel with an oxidant. As used herein, the term "solid fuel" refers to any solid fuel suitable for combustion purposes. Although the invention is discussed in the context of a pulverized coal burner, various types of coal and other solid fuels may be used with the burners and methods of the present invention.

For example, the invention may be used with many types of carbonaceous fuels, including but not limited to: anthracite, bituminous, sub-bituminous, and lignitic coals; tar; bitumen; petroleum coke; paper mill sludge solids and sewage sludge solids; wood; peat; grass; and combinations and mixtures of all of those fuels.

As used herein, the term "oxidant" refers to oxygen, oxygen-enriched air, or any other suitable oxidant with an oxygen concentration greater than about 21% by volume. One possible oxidant is commercially pure oxygen generated by a cryogenic air separation plant, a membrane or an adsorption process. The oxygen concentration of such oxidant is typically greater than 90% by volume.

As used herein the term "auxiliary gas" is a gas or mixture of gases (e.g., air, nitrogen, oxygen or recirculated products of combustion) having an oxygen concentration different than the oxygen concentration of either the primary or secondary oxidant used with a particular embodiment of the invention.

Figure 1:
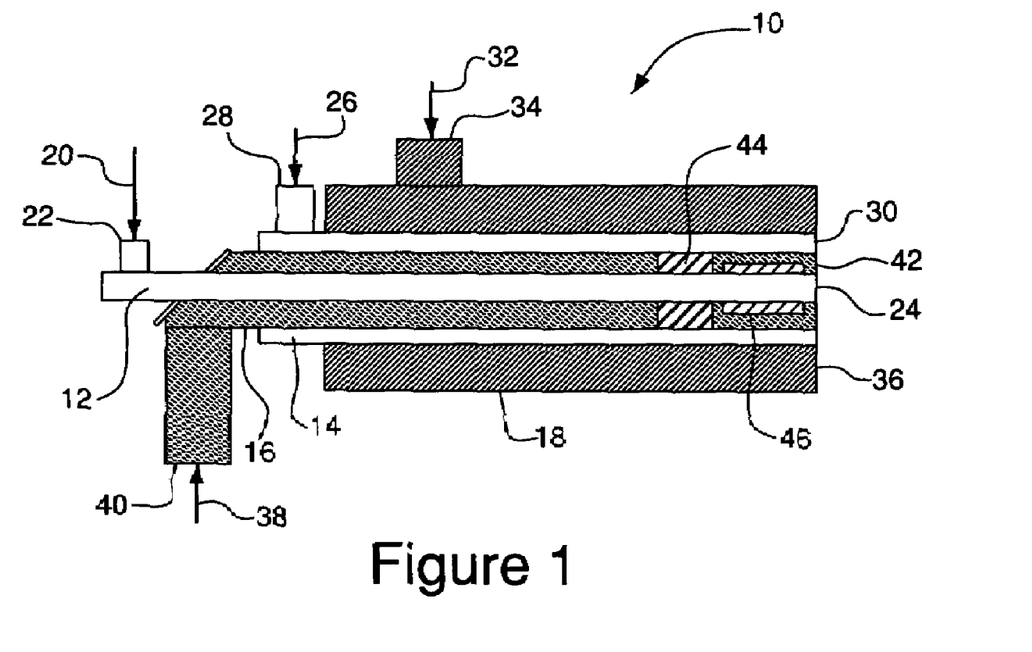
FIG. 1 is a schematic diagram of a side view of one embodiment of the invention.
Figure 2:
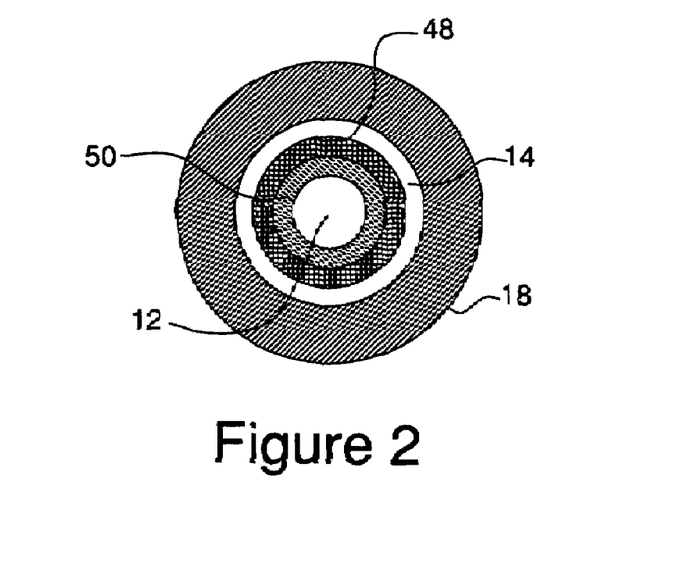
FIG. 2 is a schematic diagram of a front view of one embodiment of the invention.

The oxygen-enriched pulverized solid fuel burner 10 shown in FIGS. 1 and 2 achieves improved turndown, flame stability, and control of flame temperature, length, and shape, particularly for low volatile solid fuels. The burner includes three passages—an inner oxidant passage 12 and an annular oxidant passage 14 surrounding an annular solid fuel/transport gas passage 16. An optional outer annulus passage 18 may be used for an auxiliary gas. Enhanced performance may be achieved relative to conventional solid fuel burner technology through the adjustment of inner and outer oxidant flows, control of reactant flow profiles, and adjustment of reactant velocities.

Referring to FIG. 1, a stream 20 of an oxidant enters the inlet 22 of the inner oxidant passage 12 and is transmitted to the outlet 24 of said passage. Another stream 26 of the oxidant (or another oxidant) enters the inlet 28 of the annular oxidant passage 14 and is transmitted to the outlet 30 of said passage. A stream 32 of an optional auxiliary gas may be transmitted from the inlet 34 of the optional outer annulus passage 18 to the outlet 36 of said passage. A stream 38 of a mixture of a transport gas (e.g., air, nitrogen, recirculated products of combustion, natural gas, oxygen-enriched air) and a solid fuel (e.g., pulverized coal) enters the intake 40 of the annular solid fuel/transport gas passage 16 and is transmitted to the outtake 42 of said passage.

Figure 3:
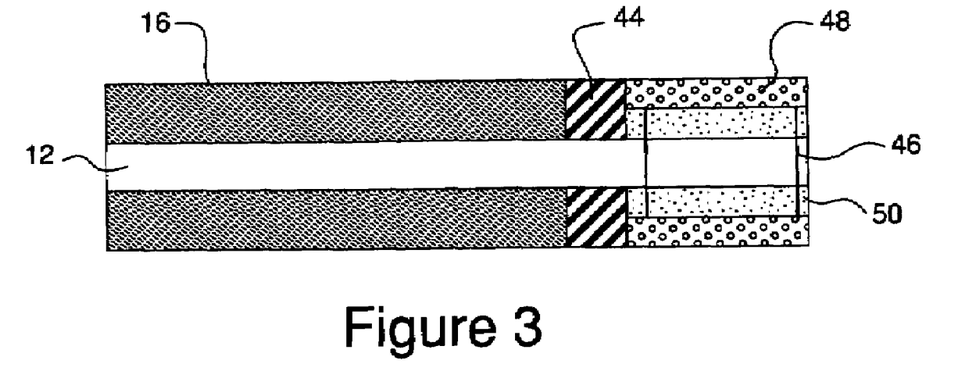
FIG. 3 is a schematic diagram of a side view illustrating the use of a solid fuel swirl generator and a vortex finder for one embodiment of the invention.

As shown in FIGS. 1 and 3, a solid fuel stratifier 44 and a separator 46 are disposed in the annular solid fuel/transport gas passage 16. The combination of the solid fuel stratifier and the separator divides the mixture of the fuel and the transport gas into two streams with distinct properties.

Persons skilled in the art will recognize that there are various devices and methods for carrying out the stratification and separation processes (the combination of which is referred to hereafter as segregation). One embodiment discussed herein uses a swirl generator as the solid fuel stratifier 44 and a vortex finder as the separator 46. The swirl generator employs centrifugal forces to stratify the solid fuel/transport gas stream into an outer dense fraction stream 48 and an inner lean fraction stream 50, as shown in FIGS. 2 and 3. The mass ratio of the solid fuel to transport gas in the lean fraction stream is less than the mass ratio of solid fuel to transport gas in the dense fraction stream. Centrifugal forces also effect the stratification based on particle size, such that the dense fraction stream generally comprises a greater percentage of coarse particles than the lean fraction stream.

One advantage of achieving this type of segregation is that the outer dense fraction stream 48 heats up more rapidly because it is deficient in transport gas which would otherwise absorb much of the locally available thermal energy. Hence, volatile species present in the solid fuel are driven off at a higher rate and combust more rapidly than if the stream was more dilute. Thus, the burner flame auto-ignites at a position closer to the burner tip and is inherently more stable than if the burner 10 did not have this segregating capability. That is, the burner flame front will form closer to the burner exit plane and be less likely to exhibit instabilities or extinguish due to process perturbations. Further, since the combustion of volatiles occurs closer to the burner tip, the local gaseous environment is more fuel-rich than if the volatiles combustion had been delayed. This facilitates a reduction in NOx emissions relative to a non-segregated stream.

The lean fraction stream 50, which consists of generally finer solid particles with higher surface area to volume ratio than exists in the dense fraction stream 48, exits the burner 10 adjacent the inner oxidant stream 20. Combustion of the lean fraction stream is accelerated by fine solid particles having a high surface area per unit volume and the enhanced oxidizing ability of the oxygen-enriched inner oxidant stream. Combustion products of the lean fraction stream thus contribute thermal energy and chemically active species (radicals) that further assist in igniting and stabilizing the dense fraction stream.

Figure 4A:
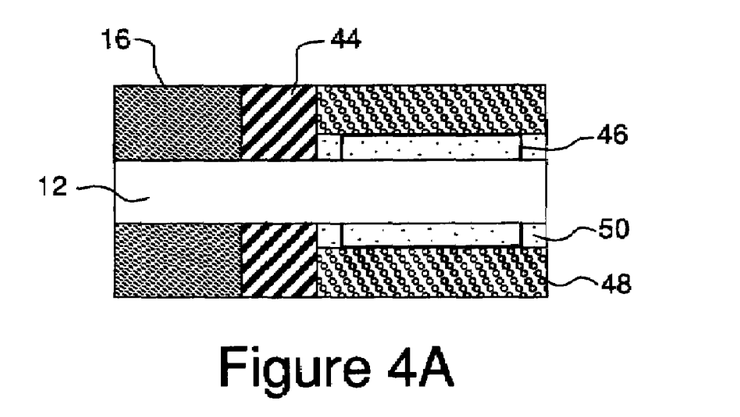
FIGS. 4A and 4B are schematic diagrams of a side view of several embodiments of the invention using different vortex finders, each having a relative difference in radius.
Figure 4B:
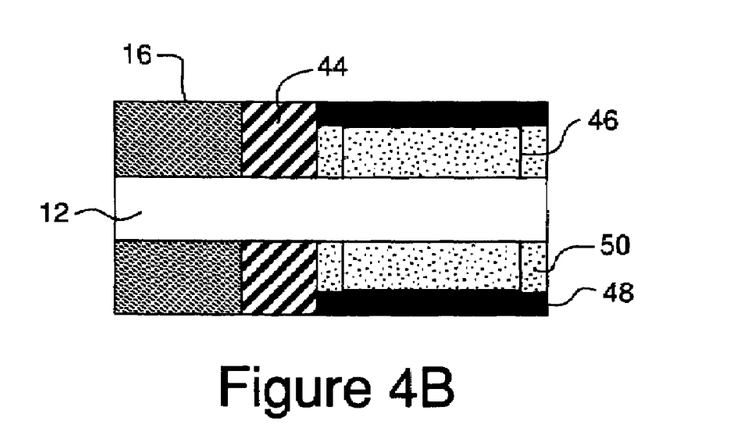

Segregation properties of solid particles in the outer dense fraction stream 48 and the inner lean fraction stream 50 can be altered by changing the size and/or radial positioning of the vortex finder (separator 46), as shown in FIGS. 4A and 4B. For purposes of illustration, FIG. 4A represents a base case wherein the vortex finder has a certain hydraulic radius, and the relative solid particle to transport gas mass flow ratio of the dense fraction stream 48 and the lean fraction stream 50 are indicated by the relative differences in shading of those streams in the base case (darker shade represents higher mass flow ratio of solid particles to transport gas). In the embodiment shown in FIG. 4B, the vortex finder has a larger hydraulic radius relative to the base case. The higher solid particle to transport gas mass flow ratio of the dense fraction stream 48 in this figure is indicated by darker shading (relative to the dense fraction stream 48 in the base case), while the lean fraction stream 50 of FIG. 4B also has a darker shading than the lean fraction stream of the base case.

The term "hydraulic radius" as used herein is equal to twice the ratio of the cross-sectional area inside the boundaries of the vortex finder to the perimeter of the vortex finder. Persons skilled in the art will recognize that the separation device (in this case, vortex finder) can take on a variety of cross-sectional shapes including, but not limited to, circular, elliptical, polygonal, or other irregular shapes or combinations thereof. Moreover, adjustment of the solid particle to transport gas mass flow ratio can also be made through variation of the axial separation distance, d, between the stratification and separation devices (see FIG. 5A).

Figure 5A:
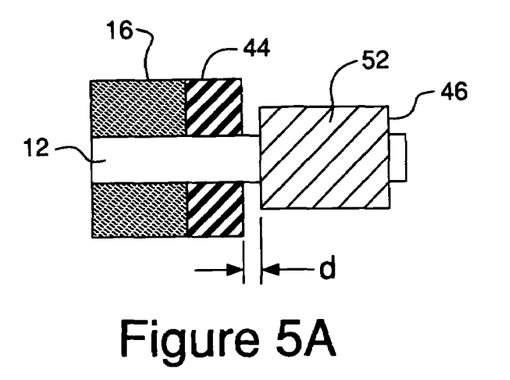
FIG. 5A is a schematic diagram of a side view of one embodiment of the invention using a vortex finder with swirl vanes.
Figure 5B:
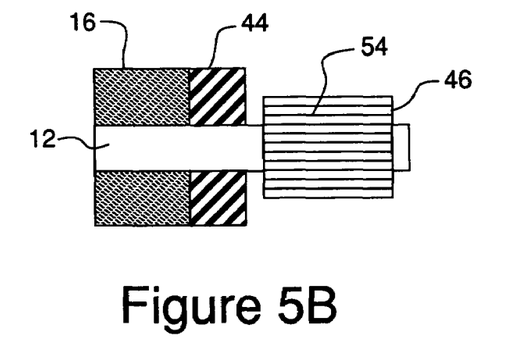
FIG. 5B is a schematic diagram of a side view of one embodiment of the invention using a vortex finder with straightening vanes.

As shown in FIGS. 5A and 5B, the aerodynamic properties of the stream 38 (see FIG. 1) of the mixture of solid fuel and transport gas may be modified by using devices such as swirl vanes 52 or straightening vanes 54 in the vortex finder (separator 46). FIG. 5A illustrates a vortex finder with swirl vanes, while FIG. 5B illustrates a vortex finder with straightening vanes. Swirl vanes act to increase the mixing rate between fuel and oxidant, thereby shortening the flame, while straightening vanes streamline the solid fuel/transport gas stream, thus slowing the rate of mixing, lowering peak temperatures, and lengthening the flame. The vanes, or similar devices, can act as flow modifiers for either the lean fraction stream 50 or the dense fraction stream 48 of the solid fuel/transport gas mixture, or both, thereby tailoring the mixing of the reactants to the desired properties of the flame.

Figure 6A:
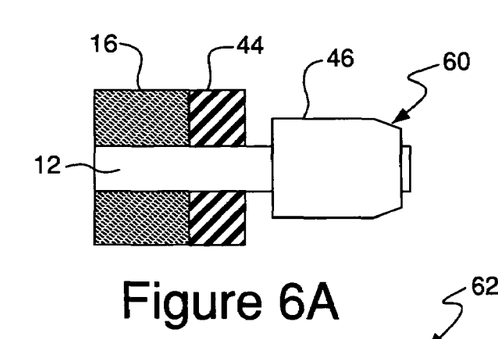
FIG. 6A is a schematic diagram of a side view of one embodiment of the invention using a vortex finder having an inward converging tip.
Figure 6B:
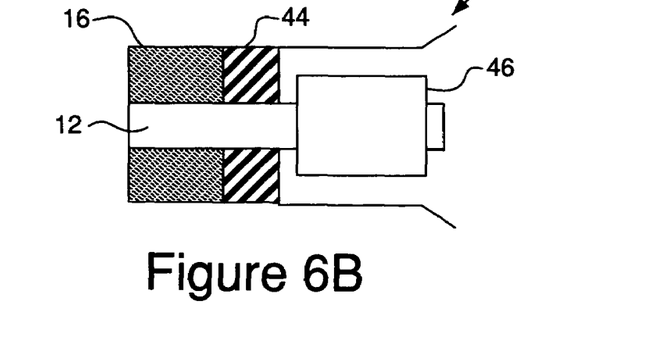
FIG. 6B is a schematic diagram of a side view of another embodiment of the invention using a solid fuel nozzle having an outward diverging tip.

The flow and mixing characteristics of the two streams (dense fraction stream 48 and lean fraction stream 50) may also be altered by profile modifications to the nozzle tip of the burner 10, as shown in FIGS. 6A and 6B. FIG. 6A illustrates inward convergence of a vortex finder tip 60, which causes the lean fraction stream 50 to mix more rapidly with the inner oxidant at the burner nozzle outlet. FIG. 6B illustrates outward divergence of a solid fuel nozzle 62, which produces a radial expansion of the dense fraction stream 48 exiting the burner nozzle, and subsequently leads to a low pressure core of reverse or recirculating flow downstream of the burner nozzle outlet. This type of flow is advantageous for promoting flame stability. The features of FIGS. 6A and 6B may be combined, resulting in a nozzle tip having an inward convergence of the vortex finder tip and an outward convergence of the solid fuel nozzle. Persons skilled in the art will recognize that flow and mixing characteristics may also be altered by adjusting the relative axial position of the outlet planes of the various reactant streams.

Figure 7:
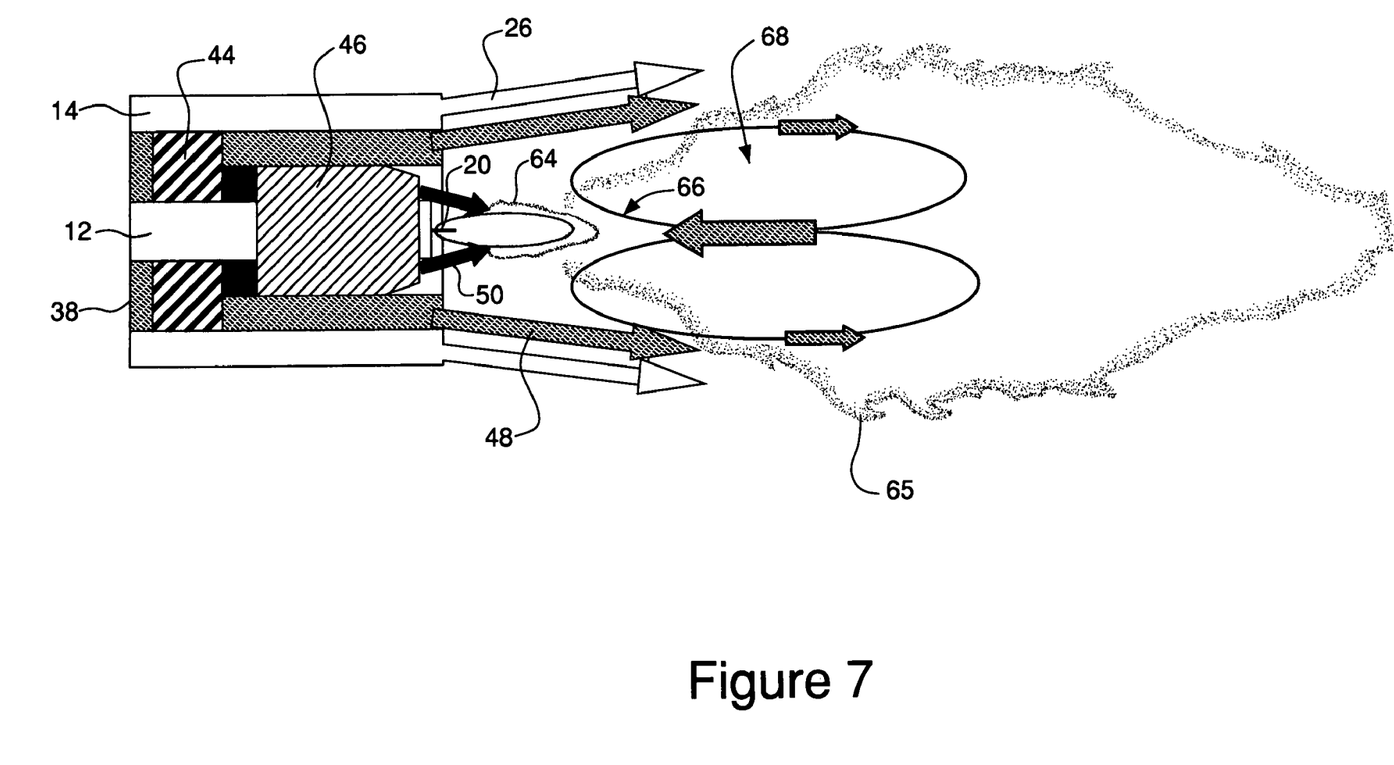
FIG. 7 is a schematic diagram illustrating a solid fuel/outer oxidant interface and two combustion zones, an inner combustion zone and an outer combustion zone, for one embodiment of the invention.

An important advantage of the present invention is the ability to create two distinct combustion zones via mixing of the inner and outer oxidant streams with the lean and dense fraction streams, respectively. FIG. 7 illustrates an embodiment of the invention in which such an advantage is achieved by directing the inner lean fraction stream 50 radially inward toward the inner oxidant stream 20. A relatively small and stable inner flame 64 is thereby generated adjacent the burner nozzle exit. An outer flame 65 is also formed, principally comprising the dense fraction stream 48, the outer oxidant stream 26 and recirculated products of combustion 66. A swirl is imparted to the outer flame causing a region of reverse flow 68 to form. Recirculated material 66 from this region of reverse flow interacts directly with the inner flame 64, causing the recirculated material to heat up and/or ignite. This heated (or ignited) recirculated material then reverses direction again as it brings its thermal energy and/or ignition source into the outer flame, further augmenting the rate of release and combustion of volatile species from the outer flame, improving flame stability and lowering NOx emissions. Moreover, the outer interface of the fuel-rich, dense fraction stream 48 benefits from interacting with the oxygen-rich, outer oxidant stream 26. Accelerated heating at this interface further improves stability while increasing thermal radiation from the outer flame and reducing carbon carryover. Persons skilled in the art will recognize that there may be other methods of mixing the reactant streams using the present invention, and respective benefits may be derived therefrom.

An important feature of the present invention is that the solid fuel/transport gas stream 38 contacts the two oxidant streams (20, 26) on two interfaces at two distinct radii. This increases the surface contact area between the fuel/transport gas and oxidant while also reducing the effective thickness of the fuel/transport gas stream over which the oxidant and the fuel mutually diffuse. This accelerates reaction of the fuel compared to conventional burners in which fuel and oxidant share only a single interface.

An additional advantage of this configuration lies in the ability to vary the flow rate and velocity of the oxidant streams (20, 26) and thereby control the shear force at both the inner and outer interfaces of the fuel/transport gas stream 38. Hence, for example, if a low volatile solid fuel is employed or a relatively short flame is desired, then the velocities of the inner and outer oxidant streams (20, 26) at the burner nozzle exit would be designed to be different than those of the lean and dense fraction streams (48, 50). In particular, if the velocity of the outer oxidant stream 26 is substantially greater than that of the dense fraction stream 48, and the velocity of the inner oxidant stream 20 is substantially less than that of the lean fraction stream 50, the shear rates will be relatively high, promoting rapid mixing and dissipation of axial momentum, leading to a relatively short and stable flame. By contrast, if a high volatile solid fuel is employed or a long, relatively low temperature flame is desired, then the velocities of the oxidant and the fuel streams at the burner nozzle outlet would be maintained at approximately the same magnitude, thus minimizing shear rates, and slowing the rate of dissipation of axial momentum and reactant mixing.

Figure 8:
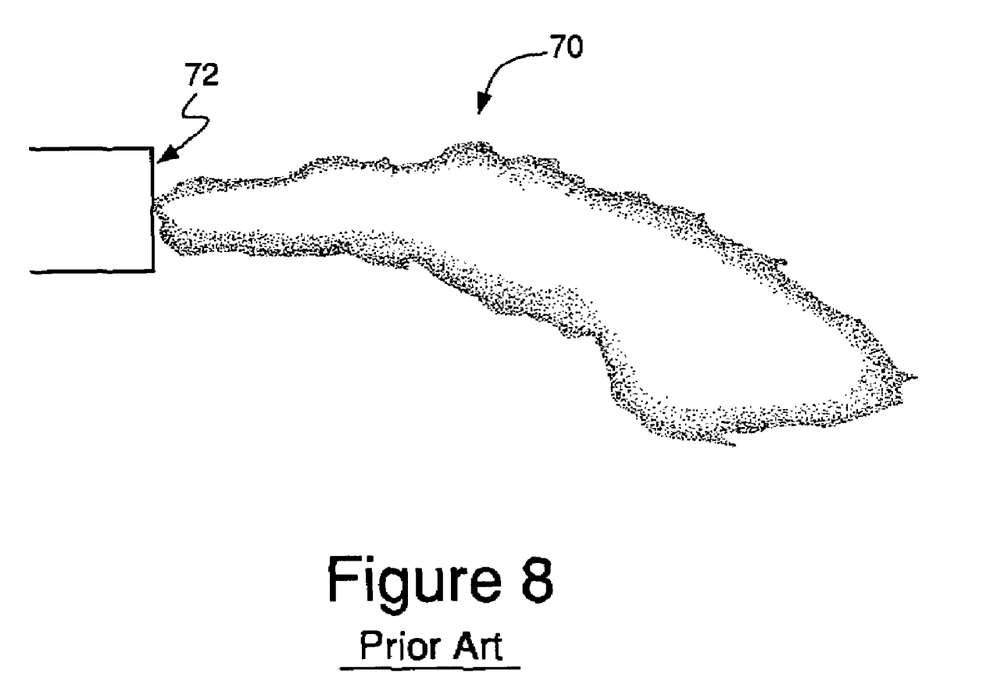
FIG. 8 is a schematic diagram illustrating a flame for a conventional pulverized coal burner.
Figure 9:
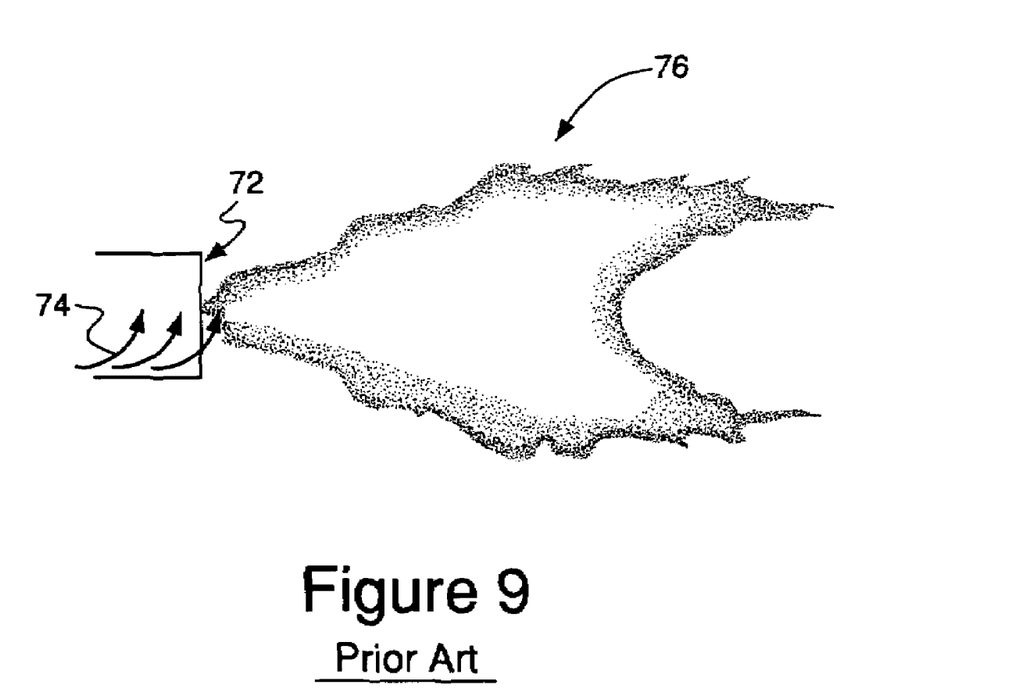
FIG. 9 is a schematic diagram illustrating a swirled flame for a conventional pulverized coal burner.

One limitation of many prior art solid fuel burners is the notoriously narrow range of fuel firing rate. This typically occurs due to breakdown of the axial momentum of the solid fuel/transport gas stream at turndown conditions. As shown in FIG. 8, the flame 70 tends to become very lazy with a consequent breakdown of the flame structure at positions relatively close to the burner nozzle exit plane 72. While swirl 74, as shown in FIG. 9, can be added to the pulverized fuel/transport gas stream to preserve a coherent flame structure, this has the added effect of shortening and broadening the flame 76, which is not always desirable.

Figure 10:
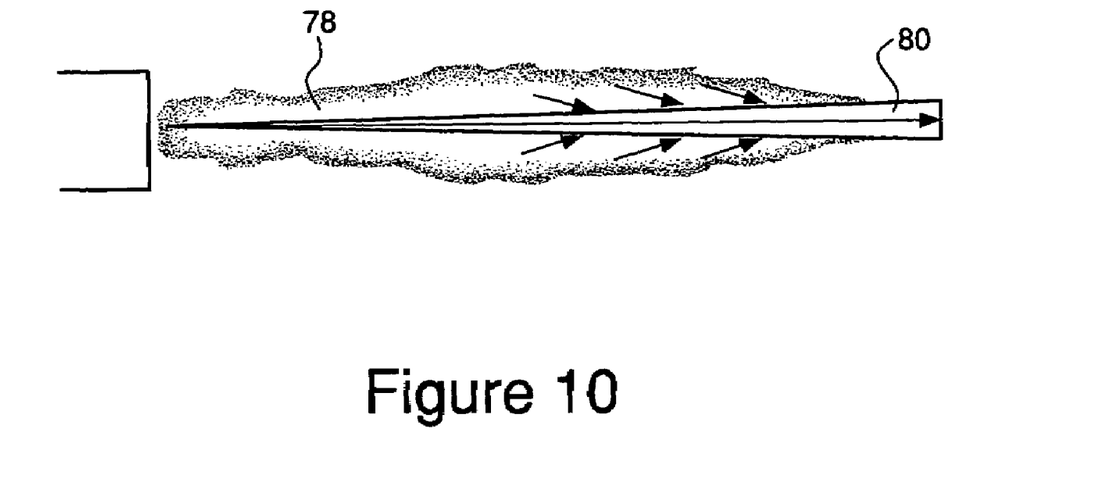
FIG. 10 is a schematic diagram illustrating a pulverized solid fuel entrained into a high momentum central oxidant jet.

The present invention preserves the coherent flame structure at turndown by increasing the flame momentum via an increase of flow to the inner oxidant passage 12. As shown in FIG. 10, the pulverized solid fuel 78 is entrained into a high momentum central oxidant jet 80. This action strengthens the burner flame structure, thus allowing greater penetration of the flame into the process heating zone without it succumbing to buoyancy-induced distortions, which are inherently difficult to control in a turbulent combustion environment. This aspect of the invention is particularly crucial in applications where loss of control of flame shape, length, or trajectory is detrimental to process safety or efficiency.

Persons skilled in the art will recognize that the split of oxidant flow rate between the inner oxidant passage 12 and the annular oxidant passage 14 may be varied in several ways. For example, a valve(s) may be used to vary the flows to the two passages. Another way is to use an automatic flow controller and two metered lines which are controlled independently to supply oxidant(s) to the two passages.

Figure 11:
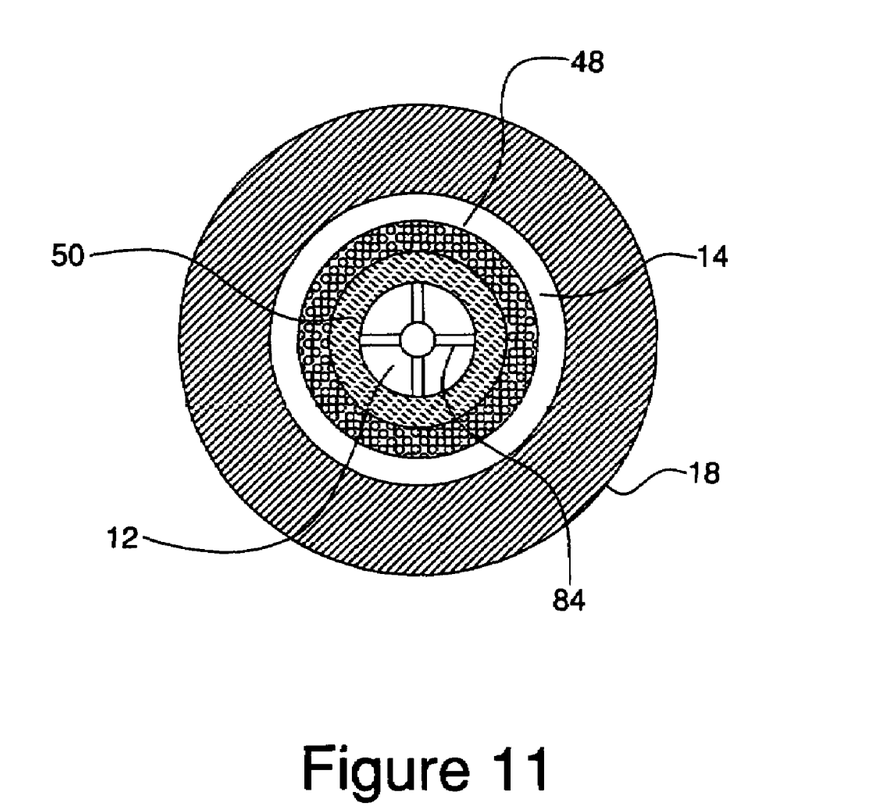
FIG. 11 is a schematic diagram illustrating an embodiment of the invention using a swirler in an inner oxidant conduit.

Depending on solid fuel properties and process constraints, it is sometimes desirable to further enhance flame stability through the use of a swirl generator (or swirler) 84 in the inner oxidant passage 12, as illustrated in FIG. 11. This inner oxidant swirler 84, when utilized, generates a small recirculation zone along the burner axis that, by virtue of its magnitude and location, assists in anchoring the flame by promoting entrainment and recirculation of the pulverized solid fuel, and by increasing residence time and heat release immediately downstream of the burner nozzle outlet.

The present invention enhances burner flame stability by segregating the stream of the solid fuel/transport gas mixture just prior to its discharge from the burner nozzle, increasing the rate of particle heat up and devolatilization, and by surrounding the stream of the solid fuel/transport gas mixture on both sides by oxidant streams. Also, burner turndown range is expanded by varying, in a controlled manner, the proportion of oxidant flow to the outer and inner oxidant passages. Thus, at turndown (i.e., reduced firing rate) conditions, the proportion of inner to outer oxidant is increased, thereby strengthening the axial momentum of the burner flame and preventing the loss of coherent flame structure that occurs with conventional solid fuel burner technology. By the same mechanism, the present invention also facilitates lengthening of the flame at reduced loads. Hence, the present invention provides a means for maintaining nearly constant flame length over the operating regime.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A burner for combusting a solid fuel, comprising:
a first oxidant conduit having a first longitudinal axis, a first oxidant inlet, and a first oxidant outlet, the first oxidant conduit adapted to transmit a first stream of an oxidant, the oxidant having an oxygen concentration greater than 21 vol. %;
a solid fuel conduit having a second longitudinal axis substantially parallel to the first longitudinal axis, a solid fuel conduit intake, and a solid fuel conduit outtake, the solid fuel conduit surrounding the first oxidant conduit and thereby forming a first annulus between the first oxidant conduit and the solid fuel conduit, the first annulus adapted to transmit a mixture of a transport gas and a plurality of particles of the solid fuel;
a second oxidant conduit having a third longitudinal axis substantially parallel the second longitudinal axis, a second oxidant inlet, and a second oxidant outlet, the second oxidant conduit positioned adjacent to and surrounding the solid fuel conduit and thereby forming a second annulus between the solid fuel conduit and the second oxidant conduit, the second annulus adapted to transmit a second stream of the oxidant or another oxidant having an oxygen concentration greater than 21 vol. %;
a solid fuel stratifier positioned in the first annulus; wherein the solid fuel stratifier segregates the mixture proximate to the solid fuel conduit outtake into a lean fraction stream of the mixture adjacent the first oxidant conduit and a dense faction stream of the mixture adjacent to the solid fuel conduit, the dense fraction stream containing a first mass ratio of the transport gas to the solid fuel, and the lean fraction stream containing a second mass ratio of the transport gas to the solid fuel, the second mass ratio being greater than the first mass ratio; and
a separator comprising an inner wall and an outer wall, the separator positioned in the first annulus and between the solid fuel stratifier and the solid fuel conduit outtake wherein the separator surrounds a portion of the first oxidant conduit and is surrounded by the solid fuel conduit thereby forming a first subsidiary annulus between the first oxidant conduit and the inner wall of the separator and a second subsidiary annulus between the outer wall of the separator and the solid fuel conduit, and wherein the separator maintains the lean fraction stream and the dense fraction stream as two distinct streams,
wherein at least a portion of the first stream of the oxidant exiting the first oxidant outlet combines during combustion with at least a portion of the lean fraction stream, thereby forming an inner combustion zone adjacent the solid fuel conduit outtake, the inner combustion zone having a first radius and a first length extending outwardly from the solid fuel outtake, and
wherein at least a portion of the second stream of the oxidant or the other oxidant exiting the second oxidant outlet combines during combustion with at least a portion of the dense fraction stream, thereby forming an outer combustion zone near the inner combustion zone, the outer combustion zone having a second radius and a second length extending outwardly from the solid fuel outtake, the second radius being greater than the first radius and the second length being greater than the first length.

2. The burner of claim 1, further comprising:
an auxiliary gas conduit having a fourth longitudinal axis substantially parallel the third longitudinal axis, an auxiliary gas inlet, and an auxiliary gas outlet spaced apart from the auxiliary gas inlet, the auxiliary gas conduit surrounding the second oxidant conduit and thereby forming a third annulus between the second oxidant conduit and the auxiliary gas conduit, the third annulus adapted to transmit a stream of an auxiliary gas entering the auxiliary gas inlet and exiting the auxiliary gas outlet.

3. The burner of claim 1, further comprising a swirl generator disposed in the first oxidant conduit.

4. The burner of claim 1, wherein the solid fuel stratifier comprises a swirl generator and the separator comprises a vortex finder.

5. The burner of claim 4, wherein the vortex finder and the swirl generator are adjustable such that the segregation of the mixture is adjusted by either increasing or decreasing at least one of a hydraulic radius of the vortex finder and a distance from the swirl generator to the vortex finder.

6. The burner of claim 4, wherein the vortex finder has either swirl vanes or straightening vanes adapted to contact at least one of the lean fraction stream and the dense fraction stream.

7. The burner of claim 4, wherein the solid fuel conduit outtake and a portion of the vortex finder proximate the solid fuel conduit outtake form a nozzle tip profile, and the nozzle tip profile is modified by at least one of an outward divergence of the solid fuel conduit outtake and an inward convergence of the portion of the vortex finder proximate the solid fuel conduit outtake.

8. The burner of claim 1, wherein the first oxidant conduit and the solid fuel conduit are substantially co-axial.

9. The burner of claim 1, wherein at least two of the first oxidant conduit, the solid fuel conduit, and the second oxidant conduit are co-axial.

10. The burner of claim 1, wherein the first oxidant conduit and the solid fuel conduit extend such that the outlet of the first oxidant conduit and the outtake of the solid fuel conduit lie essentially in a single plane, wherein the plane is perpendicular to the longitudinal axes of both the first oxidant conduit and the solid fuel conduit.

11. A method for combusting a solid fuel, comprising the steps of:
providing a first oxidant conduit having a first longitudinal axis, a first oxidant inlet, and a first oxidant outlet;
transmitting through the first oxidant conduit a first stream of an oxidant having an oxygen concentration greater than 21% vol.;
providing a solid fuel conduit having a second longitudinal axis substantially parallel to the first longitudinal axis, a solid fuel conduit intake, and a solid fuel conduit outtake, the solid fuel conduit surrounding the first oxidant conduit and thereby forming a first annulus between the first oxidant conduit and the solid fuel conduit;

transmitting through the first annulus a mixture of a transport gas and a plurality of particles of the solid fuel;

providing a second oxidant conduit having a third longitudinal axis substantially parallel to the second longitudinal axis, a second oxidant inlet, and a second oxidant outlet, the second oxidant conduit positioned adjacent to and surrounding the solid fuel conduit and thereby forming a second annulus between the solid fuel conduit and the second oxidant conduit;

transmitting through the second annulus a second stream of the oxidant or another oxidant having an oxygen concentration greater than 21% vol.;

segregating the mixture proximate the solid fuel conduit outtake into a lean fraction stream of the mixture adjacent the first oxidant conduit and a dense fraction stream of the mixture adjacent the solid fuel conduit, the dense fraction stream containing a first mass ratio of the transport gas to the solid fuel, and the lean fraction stream containing a second mass ratio of the transport gas to the solid fuel, the second mass ratio being greater than the first mass ratio;

maintaining the lean fraction stream and the dense fraction stream as two distinct streams with a separator comprising an inner wall and an outer wall, the separator positioned in the first annulus proximate to the solid fuel conduit outtake, wherein the separator surrounds a portion of the first oxidant conduit and is surrounded by the solid fuel conduit thereby forming a first subsidiary annulus between the first oxidant conduit and the inner wall of the separator and a second subsidiary annulus between the outer wall of the separator and the solid fuel conduit;

combusting at least a portion of the first stream of the oxidant with at least a portion of the lean fraction stream, thereby forming an inner combustion zone adjacent the solid fuel conduit outtake, the inner combustion zone having a first radius and a first length extending outwardly from the solid fuel outtake; and combusting at least a portion of the second stream of the oxidant or the other oxidant with at least a portion of the dense fraction stream, thereby forming an outer combustion zone near the inner combustion zone, the outer combustion zone having a second radius and a second length extending outwardly from the solid fuel outtake, the second radius being greater than the first radius and the second length being greater than the first length, wherein the combusting of the at least a portion of the lean fraction stream in the inner combustion zone contributes to the ignition and stabilization of the combustion of the dense fraction stream in the outer combustion zone.

12. The method of claim 11, comprising the further steps of:

providing an auxiliary gas conduit having a fourth longitudinal axis substantially parallel the third longitudinal axis, an auxiliary gas inlet, and an auxiliary gas outlet spaced apart from the auxiliary gas inlet, the auxiliary gas conduit surrounding the second oxidant conduit and thereby forming a third annulus between the second oxidant conduit and the auxiliary gas oxidant conduit;

transmitting through the third annulus a stream of an auxiliary gas entering the auxiliary gas inlet and exiting the auxiliary gas outlet.

13. The method of claim 11, further comprising providing a swirl generator in the first oxidant conduit.

14. The method of claim 11, further comprising providing a swirl generator in the first annulus proximate the solid fuel conduit outtake, and providing a vortex finder in the first annulus at a distance from the swirl generator at a location between the swirl generator and the solid fuel conduit outtake.

15. The method of claim 14, wherein segregation of the mixture is adjusted by either increasing or decreasing at least one of a hydraulic radius of the vortex finder and a distance from the swirl generator to the vortex finder.

16. The method of claim 14, wherein the vortex finder has either swirl vanes or straightening vanes adapted to contact at least one of the lean fraction stream and the dense fraction stream.

17. The method of claim 14, wherein the solid fuel conduit outtake and a portion of the vortex finder proximate the solid fuel conduit outtake form a nozzle tip profile, and the nozzle tip profile is modified by at least one of an outward divergence of the solid fuel conduit outtake and an inward convergence of the portion of the vortex finder proximate the solid fuel conduit outtake.

18. The method of claim 11, wherein the rate of transmission of at least one of the first stream of the oxidant and the second stream of the oxidant or another oxidant having an oxygen concentration greater than 21 vol. % is variable.

19. The method of claim 11, wherein the first oxidant conduit and the solid fuel conduit are substantially co-axial.

20. The method of claim 11, wherein at least two of the first oxidant conduit, the solid fuel conduit, and the second oxidant conduit are co-axial.

21. The method of claim 11, wherein the first oxidant conduit and the solid fuel conduit extend such that the outlet of the first oxidant conduit and the outtake of the solid fuel conduit lie essentially in a single plane, wherein the plane is perpendicular to the longitudinal axes of both the first oxidant conduit and the solid fuel conduit, and wherein a portion of the first stream of the oxidant initially contacts a portion of the lean fraction stream of the mixture at about the single plane.

* * * * *